United States Patent
Wang et al.

(10) Patent No.: US 10,848,264 B2
(45) Date of Patent: Nov. 24, 2020

(54) TRANSMITTING DATA FROM A FIRST TO SECOND COMMUNICATION DEVICE USING TWO DIFFERENT MODULATION/CODING SCHEMES

(71) Applicant: Telefonaktiebolaget LM Ericsson (publ), Stockholm (SE)

(72) Inventors: Yu Wang, Solna (SE); Guido Roland Hiertz, Aachen (DE); Filip Mestanov, Brottby (SE); Leif Wilhelmsson, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/334,044

(22) PCT Filed: Sep. 23, 2016

(86) PCT No.: PCT/SE2016/050897
§ 371 (c)(1),
(2) Date: Mar. 18, 2019

(87) PCT Pub. No.: WO2018/056875
PCT Pub. Date: Mar. 29, 2018

(65) Prior Publication Data
US 2019/0260497 A1    Aug. 22, 2019

(51) Int. Cl.
*H04L 27/26* (2006.01)
*H04L 1/00* (2006.01)
(Continued)

(52) U.S. Cl.
CPC .......... *H04L 1/0003* (2013.01); *H04L 1/0008* (2013.01); *H04L 1/0009* (2013.01);
(Continued)

(58) Field of Classification Search
CPC ... H04L 1/0003; H04L 1/0009; H04L 1/0008; H04L 1/0084; H04L 5/0055; H04W 72/0446
See application file for complete search history.

(56) References Cited

U.S. PATENT DOCUMENTS 9,680,624 B2 * 6/2017 Nam ...................... H04L 5/0026
9,763,246 B2 * 9/2017 Chen ................. H04W 72/0453
(Continued)

OTHER PUBLICATIONS

Minho Kim, Member, IEEE, and Chong-Ho Choi, Member, IEEE—Probing-Based Link Adaptation for High Data Rate Wireless LANs, IEEE Transactions on Wireless Communications, vol. 11, No. 7, Jul. 2012 (Year: 2012).*
(Continued)

*Primary Examiner* — Sithu Ko
*Assistant Examiner* — Malick A Sohrab
(74) *Attorney, Agent, or Firm* — Sage Patent Group

(57) ABSTRACT

Method performed by a first communication device (101) or transmitting data to a second communication device (102). The first communication device (101) transmits (603) the data in a set of time-frequency resources (800) scheduled for transmission by the first communication device (101). The set of time-frequency resources (800) has a fixed duration and comprises: a) a first part (801) comprising the data and b) a second part (802). The first part (801) has a shorter duration than the fixed duration. The transmitting (603) of the data in the first part (801) is performed with a first modulation and coding scheme (MCS). The second part (802) has a remaining duration of the fixed duration. The second part (802) comprises at least one of: a padding, and additional data. The transmitting (603) further comprises transmitting said at least one of: the padding and the additional data, with a second MCS.

16 Claims, 9 Drawing Sheets

(51) Int. Cl.
*H04L 5/00* (2006.01)
*H04W 72/04* (2009.01)

(52) U.S. Cl.
CPC .......... *H04L 1/0084* (2013.01); *H04L 5/0055* (2013.01); *H04W 72/0446* (2013.01)

(56) References Cited

U.S. PATENT DOCUMENTS

| | | |
|---|---|---|
| 2012/0028671 A1 | 2/2012 | Niu et al. |
| 2013/0031441 A1 | 1/2013 | Ngo et al. |
| 2014/0241168 A1* | 8/2014 | Merlin .................. H04L 1/0026 370/241 |
| 2014/0269249 A1* | 9/2014 | Bai ....................... H04L 1/0003 370/204 |

OTHER PUBLICATIONS

Minho Kim, Member, IEEE, and Chong-Ho Choi, Member, IEEE—Probing-Based Link Adaptation for High Data Rate Wireless LANs, IEEE Transactions on Wireless Communications, vol. 11, No. 7, Jul. 2012 (Note: NPL document supplied by applicant and also attached to prior office action) (Year: 2012).*

Kim, Minho, et al., "Probing-Based Link Adaptation for High Data Rate Wireless LANs", IEEE Transactions on Wireless Communications, vol. 11, No. 7, Jul. 2012, 2382-2390.

* cited by examiner

TRANSMITTING DATA FROM A FIRST TO SECOND COMMUNICATION DEVICE USING TWO DIFFERENT MODULATION/CODING SCHEMES

TECHNICAL FIELD

The present disclosure relates generally to a first communication device and methods performed thereby for transmitting data to a second communication device. The present disclosure also relates generally to the second communication device and methods performed thereby for adjusting one or more transmission parameters. The present disclosure further relates generally to computer programs and computer-readable storage mediums, having stored thereon the computer programs to carry out these methods.

BACKGROUND

Communication devices such as wireless devices are also known as e.g. STAtions (STA), User Equipments (UE), mobile terminals, wireless terminals and/or Mobile Stations (MS). Wireless devices are enabled to communicate wirelessly, via radio communication, in a wireless communication network, which may also be a cellular radio system, cellular system, or cellular network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via a Radio Access Network (RAN), with another entity, such as another communication device.

Communication devices may also be network nodes, or Access Points (AP). The term AP is used herein to represent any node of a radio network that is operative to communicate radio signals with wireless devices. The AP discussed herein may also be referred to as a network node, base station, radio node, e-NodeB, eNB, NB, base transceiver station, etc., depending on the type of network and terminology used. Multiple wireless devices may be served by an access point for receiving data.

In the field of mobile or wireless communication, different types of radio networks have been developed to provide radio access for various wireless devices. A Wireless Local Area Network (WLAN) technology has been standardized by IEEE in the 802.11 series of specifications, i.e., as "IEEE Standard for Information technology—Telecommunications and information exchange between systems. Local and metropolitan area networks—Specific requirements. Part 11: Wireless LAN Medium Access Control (MAC) and Physical Layer (PHY) Specifications". WLAN is known under its marketing brand "Wi-Fi" and as currently specified, Wi-Fi systems may be primarily operated in the 2.4 GHz or 5 GHz bands. Wi-Fi may be typically used to refer to devices that are certified by the Wi-Fi Alliance for interoperability. Herein, WLAN and Wi-Fi may be used interchangeably.

The IEEE 802.11 specifications regulate the functions and operations of the Wi-Fi access points or wireless terminals, which may be collectively known as "stations" or "STA," in the IEEE 802.11, and may be referred to herein as communication devices. The IEEE 802.11 specifications also regulate the functions the physical layer protocols, Medium Access Control (MAC) layer protocols, and other aspects needed to secure compatibility and inter-operability between access points and portable terminals. Because Wi-Fi is generally operated in unlicensed bands, communication over Wi-Fi may be subject to interference sources from any number of both known and unknown devices. Wi-Fi is commonly used as wireless extensions to fixed broadband access, e.g., in domestic environments and in so-called hotspots, like airports, train stations and restaurants.

Recently, Wi-Fi has been subject to increased interest from cellular network operators, who are studying the possibility of using Wi-Fi for purposes beyond its conventional role as an extension to fixed broadband access. These operators are responding to the ever-increasing market demands for wireless bandwidth, and are interested in using Wi-Fi technology as an extension of, or alternative to, cellular radio access network technologies. Cellular operators that are currently serving mobile users with, for example, any of the technologies standardized by the 3GPP, including the radio-access technologies known as LTE, Universal Mobile Telecommunications System/Wideband Code-Division Multiple Access, and Global System for Mobile Communications (GSM), see Wi-Fi as a wireless technology that may provide good additional support for users in their regular cellular networks.

WLAN may allow completely standalone operation in the unlicensed spectrum. Wi-Fi terminals may asynchronously access the medium and thus show good Uplink (UL) performance characteristics, especially in congested network conditions.

Contention-based uplink transmission generally means that any wireless device may transmit data or a message to an access point on a shared radio channel without reserving radio resources in advance, at the risk of collision when two or more wireless devices happen to transmit simultaneously such that the access point is not able to decode the colliding transmissions. In typical deployments of WLAN, Carrier Sense Multiple Access with Collision Avoidance (CSMA/CA) may be used for medium access. This means that a channel may be sensed to perform a Clear Channel Assessment (CCA), and a transmission may be initiated only if the channel is declared as Idle. In case the channel is declared as Busy, the transmission may be deferred until the channel is deemed to be Idle. When the range of several Access Points (APs) using the same frequency may overlap, this means that all transmissions related to one AP may be deferred in case a transmission on the same frequency to or from another AP which is within range may be detected. Effectively, this means that if several APs are within range, they may have to share the channel in time, and the throughput for the individual APs may be severely degraded. A general illustration of the Listen-Before-Talk (LBT) mechanism in Wi-Fi is shown in FIG. 1.

After a Wi-Fi station (STA) A transmits a data frame to a station B, represented in the figure by the two wavy lines and the indication Busy Wireless Medium (WM), station B may transmit the ACK frame back to station A with a delay of 16 microseconds (μs), the so-called Short Inter-frame Spacing (SIFS). The SIFS duration may be understood as representing the nominal time, in μs, that the Wi-Fi Medium Access Control (MAC) and PHysical Layer (PHY) may require in order to receive the last symbol of a frame at the air interface, process the frame, and respond with the first symbol on the air interface of the earliest possible response frame. Such an ACK frame may be transmitted by station B without performing an LBT operation. To prevent another station interfering with such an ACK frame transmission, a station may defer for a duration of 34 μs, referred to as Distributed Coordination Function Inter-frame Spacing (DIFS), after the channel is observed to be occupied before assessing again whether the channel is occupied. This is represented in FIG. 1 as defer access.

Therefore, a station that wishes to transmit, may first perform a CCA by sensing the medium for a fixed duration DIFS. If the medium is idle, then the station may assume that it may take ownership of the medium and begin a frame exchange sequence. If the medium is busy, the station may wait for the medium to go idle, defer for DIFS, and wait for a further random backoff period.

In the above basic protocol, when the medium becomes available, multiple Wi-Fi stations may be ready to transmit, which may result in collision. To reduce collisions, stations intending to transmit may select a random backoff counter and defer for that number of slot channel idle times. The random backoff is a procedure performed based on a so called Contention Window, wherein a random number of slots wherein the channel is to be found idle before transmission may take place is drawn from the range that may be specified by the Contention Window. The random backoff counter may be selected as a random integer drawn from a uniform distribution over the interval of [0, Contention Window (CW)]. This number may be counted down as long as the medium is found to be idle, and the counter may be frozen when the medium is found to be busy. When the count goes down to zero, transmission, e.g., of data, as shown in the Figure, may start. The default size of the random backoff contention window, CWminimum (CWmin), is set in the IEEE specifications. Note that collisions may still happen even under this random backoff protocol when there are many stations contending for the channel access. Hence, to avoid recurring collisions, the backoff contention window size CW may be doubled whenever the station detects a collision of its transmission up to a limit, CWmaximum (CWmax), also set in the IEEE specifications. The Contention Window may be increased if previous transmissions are not received successfully by the intended recipient. When a station succeeds in a transmission without collision, it may reset its random backoff contention window size back to the default value CWmin.

The Point Coordination Function Inter-frame Spacing (PIFS) may be used to gain priority access to the medium, and may be shorter than the DIFS duration. Among other cases, it may be used by STAs operating under Point Coordination Function (PCF), to transmit Beacon Frames with priority. At the nominal beginning of each Contention-Free Period (CFP), where access to the medium is coordinated by the Point Coordinator (PC), the PC may sense the medium. When the medium is determined to be idle for one PIFS period, generally 25 µs, the PC may transmit a Beacon frame containing the Contention-Free (CF) Parameter Set element and a delivery traffic indication message element. The CF parameter set may carry parameters that may be needed to support PCF operation. A delivery traffic indication map may be understood as a traffic indication map which may inform the STAs about the presence of buffered multicast/broadcast data on the AP.

Recently, IEEE 802.11 has been working on a new amendment (802.11ax) that aims at improving the WLAN performance in dense environments. Several new features have been proposed and are currently under development. Many of these features target improvements of multi user transmissions, most notably the introduction of Uplink Multi-User MIMO (UL MU MIMO), and downlink and uplink Orthogonal Frequency Division Multiple Access (DL/UL OFDMA) are expected to provide increased spectral efficiency compared to current systems. OFDMA may be understood as a multiple access scheme relying on the use of Orthogonal Frequency Division Multiplexing (OFDM), where individual subcarriers, or groups of subcarriers, may be assigned to distinct users, based on scheduling decisions.

Legacy WLAN systems are asynchronous and devices independently compete for access to the wireless medium. The channel access is based on CSMA/CA mechanism described above, and the network nodes, which may be referred to as Access Points (APs), and the associated stations (STAs), all may have to compete among themselves to grab the channel and transmit. However, the introduction of UL MU MIMO and UL OFDMA, which both are typical for synchronous systems, in which some degree of scheduling may be needed, led to the introduction of the so-called Trigger Frame (TF). The TF may be part of the scheduling signaling and enables the AP to schedule UL MU transmission.

The channel access procedure when using TF is depicted in the schematic diagram of FIG. 2. Initially, the AP gains access to the wireless channel by means of the regular CSMA/CA procedure. Once the AP has channel access, the Transmission OPportunity (TXOP) begins. The AP sends a DL TF, which indicates the resource allocations for the different STAs that are scheduled. After the TF, indicated in the Figure as "Trigger", a UL MU Physical Packet Data Unit (PPDU) is transmitted by all scheduled STAs simultaneously, it may be either a UL MU MIMO or UL MU ODFMA. After the UL MU transmission, a Downlink (DL) acknowledgement (ACK) or block acknowledgement (BA) may be usually transmitted. Time (t) is indicated as a horizontal arrow moving to the right.

While an UL MU transmission may help reducing the overhead of carrying several consecutive CSMA/CA channel access procedures, it does not come without limitations. In order to occupy the full bandwidth, in case other devices perform carrier sensing, the transmissions from all different STAs need to finish at the exact same time.

There are at least two reasons for which the data transmission may not utilize the whole scheduled duration. Firstly, since different STAs may have different amounts of data to be sent, padding will be required if some STAs have insufficient amount of data in their buffer to fill in the scheduled duration. Secondly, after a STA allocates a number of PDUs in the UL transmission, the remaining duration may not be sufficient to transmit an additional PDU. The padding is not part of the useful data meant for transmission, and is therefore discarded at the receiver side. In certain scenarios, the padding overhead may be notable, ranging between 15 and 25%, depending on packet size. The wasted resources due to padding are illustrated in FIG. 3. In the schematic diagram of FIG. 3, the TF is indicated as "Preamble". The ULMU PPDU is shown as comprising, for every STA of four different STA: STA1, STA2, STA3 and STA4, a data portion in white and a padding portion, in black. Each of the horizontal rows in the ULMU PPDU portion of FIG. 3 represents each of the individual subcarriers, or groups of subcarriers, that are assigned to STA1, STA2, STA3 and STA4. Time (t) is indicated as a horizontal arrow moving to the right.

Existing methods for UL MU transmission entail an inefficient use of bandwidth due to padding, and consequently result in poor performance of a wireless communications network.

SUMMARY

It is an object of embodiments herein to improve the usage of time-frequency resources in wireless communications networks.

According to a first aspect of embodiments herein, the object is achieved by a method performed by a first communication device. The method is for transmitting data to a second communication device. The first communication device and the second communication device operate in a wireless communications network. The first communication device transmits the data to the second communication device 102. The data is comprised in a set of time-frequency resources scheduled for transmission by the first communication device to the second communication device. The set of time-frequency resources has a fixed duration. The set of time-frequency resources comprises: a) a first part and b) a second part. The first part comprises the data. The first part has a shorter duration than the fixed duration of the set of time-frequency resources. The transmitting of the data in the first part is performed with a first modulation and coding scheme (MCS). The second part has a remaining duration of the fixed duration of the set of time-frequency resources. The second part comprises at least one of: a padding, and additional data from the first communication device. The transmitting further comprises transmitting said at least one of: the padding and the additional data, with a second MCS. The second MCS is different than the first MCS.

According to a second aspect of embodiments herein, the object is achieved by a method performed by the second communication device. The method is for adjusting one or more transmission parameters. The second communication device operates in the wireless communications network. The second communication device decodes the data received from the first communication device operating in the wireless communications network. The data is in the set of time-frequency resources scheduled for transmission to the second communication device. The set of time-frequency resources has the fixed duration. The set of time-frequency resources comprises: a) the first part and b) the second part. The first part comprises the data. The first part has the shorter duration than the fixed duration of the set of time-frequency resources. The decoding of the data in the first part is performed according to the first MCS. The second part has the remaining duration of the fixed duration of the set of time-frequency resources. The second part comprises the at least one of: the padding, and the additional data from the first communication device. The decoding further comprises decoding said at least one of: the padding and the additional data, with the second MCS. The second MCS is different than the first MCS. The second communication device adjusts the one or more transmission parameters used by the second communication device based on a success of the decoding of the second part with the second MCS.

According to a third aspect of embodiments herein, the object is achieved by the first communication device configured to transmit data to the second communication device. The first communication device and the second communication device are configured to operate in the wireless communications network. The first communication device is further configured to transmit the data to the second communication device. The data is configured to be comprised in the set of time-frequency resources scheduled for transmission by the first communication device to the second communication device. The set of time-frequency resources is configured to have the fixed duration. The set of time-frequency resources is further configured to comprise: a) the first part and b) the second part. The first part is configured to comprise the data. The first part is configured to have a shorter duration than the fixed duration of the set of time-frequency resources. To transmit the data in the first part is configured to be performed with the first MCS. The second part is configured to have the remaining duration of the fixed duration of the set of time-frequency resources. The second part is configured to comprise the at least one of: the padding, and the additional data from the first communication device. To transmit is further configured to comprise to transmit said at least one of: the padding and the additional data, with the second MCS. The second MCS is different than the first MCS.

According to a fourth aspect of embodiments herein, the object is achieved by the second communication device configured to adjust the one or more transmission parameters. The second communication device is configured to operate in the wireless communications network. The second communication device is further configured to decode the data configured to be received from the first communication device configured to operate in the wireless communications network. The data is configured to be comprised in the set of time-frequency resources configured to be scheduled for transmission to the second communication device. The set of time-frequency resources is configured to have the fixed duration. The set of time-frequency resources comprises: a) the first part and b) the second part. The first part is configured to comprise the data. The first part is configured to have the shorter duration than the fixed duration of the set of time-frequency resources. To decode the data in the first part is configured to be performed according to the first MCS. The second part is configured to have the remaining duration of the fixed duration of the set of time-frequency resources. The second part is configured to comprise the at least one of: the padding, and the additional data from the first communication device. To decode further comprises to decode said at least one of: the padding and the additional data, with the second MCS. The second MCS is different than the first MCS. The second communication device is also configured to adjust the one or more transmission parameters configured to be used by the second communication device based on the success of the decoding of the second part with the second MCS.

According to a fifth aspect of embodiments herein, the object is achieved by a computer program. The computer program comprises instructions which, when executed on at least one processor, cause the at least one processor to carry out the method performed by the first communication device.

According to a sixth aspect of embodiments herein, the object is achieved by computer-readable storage medium. The computer-readable storage medium has stored thereon a computer program comprising instructions which, when executed on at least one processor, cause the at least one processor to carry out the method performed by the first communication device.

According to a seventh aspect of embodiments herein, the object is achieved by a computer program. The computer program comprises instructions which, when executed on at least one processor, cause the at least one processor to carry out the method performed by the second communication device.

According to an eighth aspect of embodiments herein, the object is achieved by computer-readable storage medium. The computer-readable storage medium has stored thereon a computer program comprising instructions which, when executed on at least one processor, cause the at least one processor to carry out the method performed by the second communication device.

By the first communication device transmitting the second part with the second MCS, the second MCS being different than the first MCS, the first communication device enables the second communication device to obtain feedback on two different MCSs, the first one and the second one. This in turn allows the second communication device to adjust one or more transmission parameters used by the second communication device based on the success of the decoding of the second part with the second MCS in comparison to the success of decoding the first part with the first MCS. The first communication device may even be able to transmit additional data in its buffer on the second part of the set of time-frequency resources. Accordingly, the second part of the set of time-frequency resources, instead of being wasted, is used to provide information to the second communication device to perform link adaptation, and in some embodiments even to transmit additional information. The time-frequency resources in the wireless communications network are therefore better used. The throughput may be increased and latency may be decreased, improving the overall performance of the wireless communications network.

BRIEF DESCRIPTION OF THE DRAWINGS

Examples of embodiments herein are described in more detail with reference to the accompanying drawings, the content of which is briefly summarized in the following list.

DETAILED DESCRIPTION

As part of the development of embodiments herein, a problem with existing methods will first be identified and discussed.

Figure 1:
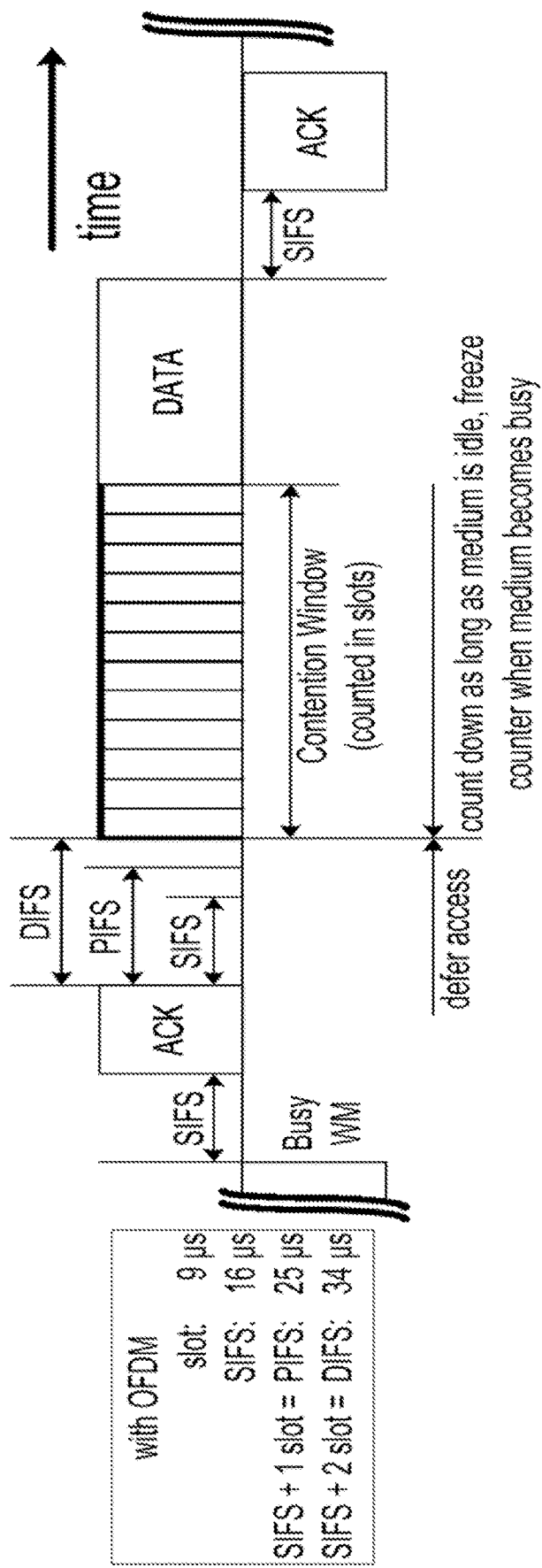
FIG. 1 is a schematic diagram illustrating an example of LBT in Wi-Fi.
Figure 2:
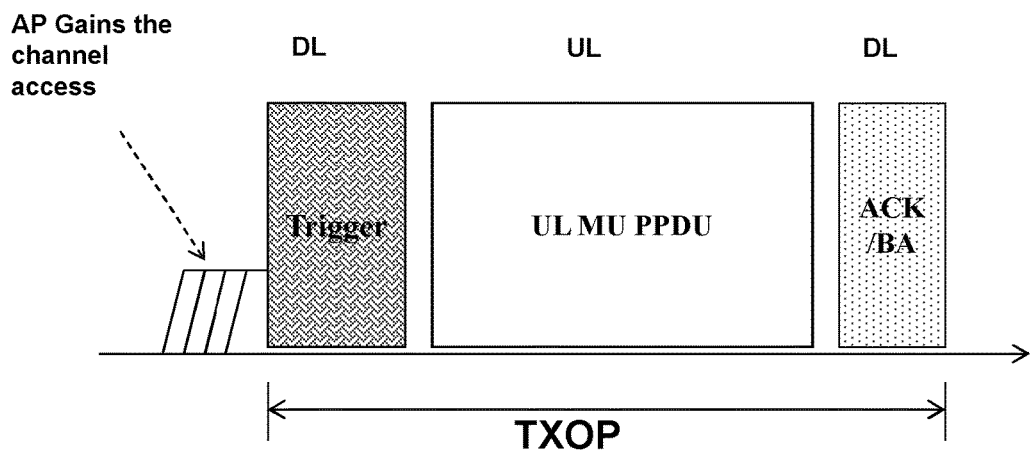
FIG. 2 is a schematic diagram illustrating UL MU transmission in 802.11ax.
Figure 3:
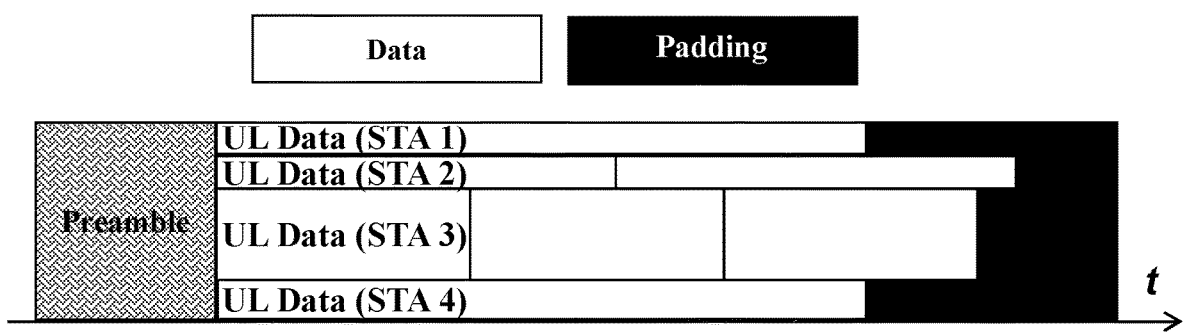
FIG. 3 is a schematic diagram illustrating UL OFDMA transmission with padding.
Figure 4:
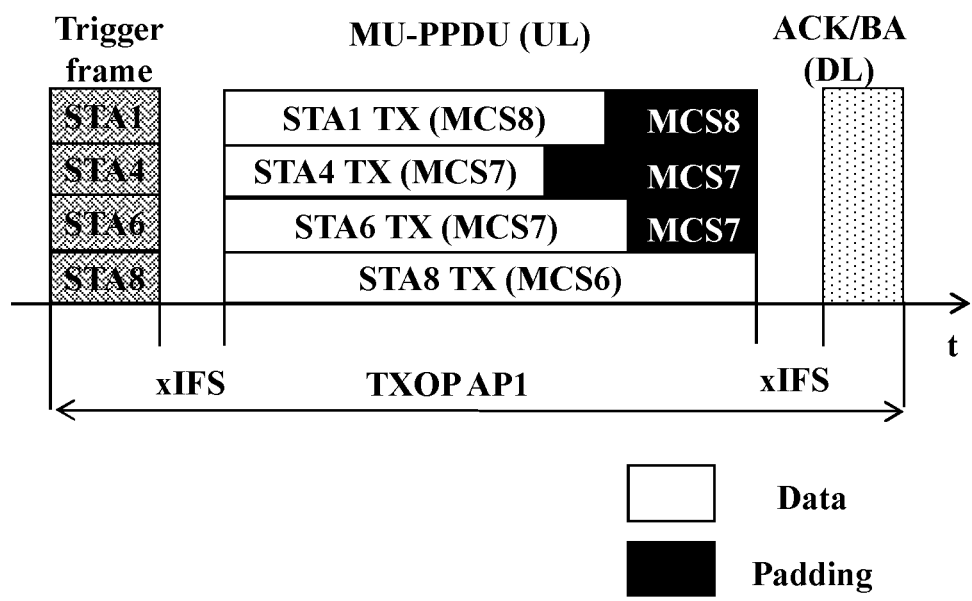
FIG. 4 is a schematic diagram illustrating 802.11ax transmission with padding, according to existing methods.

The existing 802.11ax padding procedure is depicted in the schematic diagram of FIG. 4. Once an AP, AP1 in this Figure, has channel access, the Transmission OPportunity of AP1 (TXOP AP1) begins. As seen in the figure, STA1, STA4, STA6 and STA8 are scheduled by the AP for an UL MU transmission. The AP1 begins by sending a trigger frame in this case to four different STA: STA1, STA4, STA6 and STA8. Each of the horizontal rows in the TF and in the ULMU PPDU portion of FIG. 4 represents each of the individual subcarriers, or groups of subcarriers, that are assigned to STA1, STA4, STA6 and STA8, respectively. The ULMU PPDU is shown as comprising, for every STA of four different STA: STA1, STA4, STA6 and STA8, a data portion in white STAs 1, 4, and 6 do not have a sufficient amount of packets resp. data buffered to fill the radio resources assigned by the AP. Consequently, the STAs add padding to the end of their data. The padding portion is shown in black. According to current 802.11 procedures, STAs send the actual data and the padding using the same MCS. Each of the STA1, STA4, STA6 and STA8 may use a different MCS. For the STA that have a data portion and a padding portion, STA1, STA4, and STA6, the same MCS is used for the data portion and the padding portion. The ACK/BA portion is also shown in FIG. 4 with a dotted block. In this particular example, a certain Inter-frame Spacing "x" (xIFS) takes place between the TF and the MU-PPDU and between the MU-PPDU and the ACK or BA (ACK/BA). In the particular example of FIG. 4, STA8 does not require padding, as its data portion occupies the whole duration of the MU-PPDU. Time (t) is indicated as a horizontal arrow moving to the right. On the receiver side, in this case the API, when the MU PPDUs are received and processed, the padding portion of the PPDU is discarded. Hence, the existing 802.11ax padding procedure represents an inefficient use of the bandwidth, leading to wasted resources and unnecessary communication delays.

Embodiments herein may be understood to replace the currently existing padding procedure, since padding does not carry useful information. Embodiments herein may be understood to provide for methods to make use of the radio resources that existing methods spend for padding in an efficient way. Embodiments herein further provide for methods for link adaptation assistance.

Embodiments will now be described more fully hereinafter with reference to the accompanying drawings, in which examples are shown. In this section, the embodiments herein will be illustrated in more detail by a number of exemplary embodiments. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from the IEEE 802.11 WLAN standard has been used in this disclosure to exemplify the embodiments herein, this should not be seen as limiting the scope of the embodiments herein to only the aforementioned system. It is to be understood that the proposed methods may also apply to different variations of LTE operating in unlicensed spectrum, such as LTE in Unlicensed Spectrum (LTE-U), also known as standalone-LTE, LAA, and MuLTEfire systems.

Figure 5:
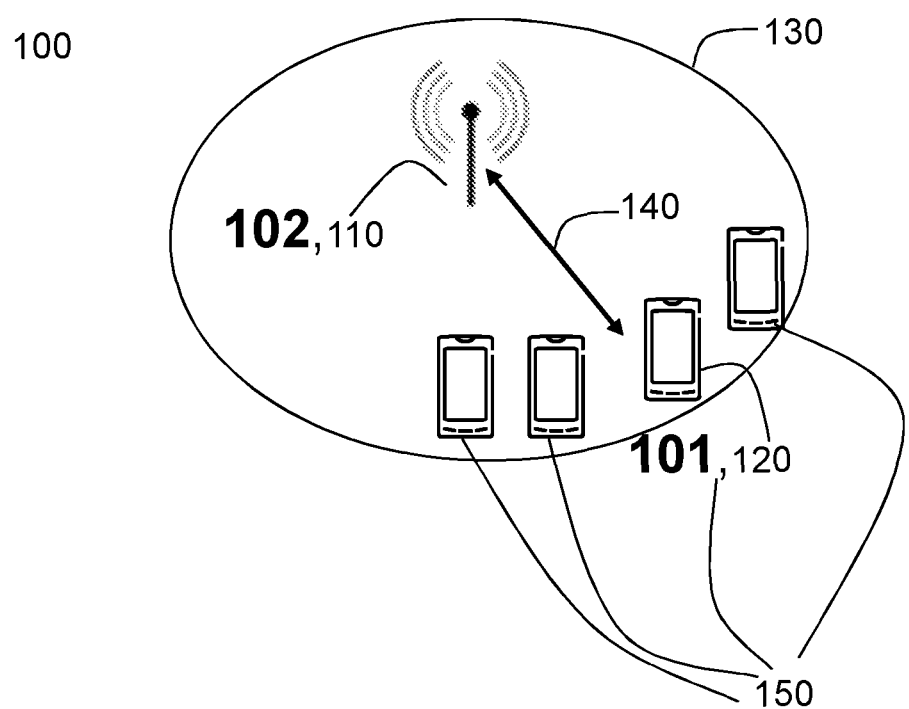
FIG. 5 is a schematic diagram illustrating embodiments of a wireless communications network, according to embodiments herein.

FIG. 5 depicts an example of a wireless communications network 100, sometimes also referred to as a cellular radio system, cellular network or wireless communications system, in which embodiments herein may be implemented. The wireless communications network 100 may typically be a WLAN network. However, the wireless communications network 100 may also be, for example, a network such as a Long-Term Evolution (LTE) network, e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), 5G system or any cellular network or system with similar requirements to those of LTE operating in unlicensed spectrum, such as LTE in Unlicensed Spectrum (LTE-U), also known as standalone- LTE, LAA, and MuLTEfire systems. Thus, although terminology from WLAN may be used in this disclosure to exemplify embodiments herein, this should not be seen as limiting the scope of the embodiments herein to only the aforementioned system.

The wireless communications network 100 comprises a plurality of communication devices, such as the first communication device 101, and the second communication device 102. Any of the first communication device 101 and the second communication device 102 may be a network node such as network node 110 described below, or a wireless device such as wireless device 120 described below. The first communication device 101 is different than the second communication device 102. Typically, the first communication device 101 will be the wireless device 120, e.g., a STA, and the second communication device 102 will be the network node 110, e.g., an AP. This corresponds to the non-limiting particular example illustrated in FIG. 5. In Device to Device (D2D) communications, both of the first communication device 101 and the second communication device 102 may be different wireless devices, both in the UL and in the DL.

The wireless communications network 100 comprises a plurality of network nodes whereof the network node 110 is depicted in FIG. 5. The network node 110 may be an AP, such as a radio base station, for example an eNB, an eNodeB, or an Home Node B, an Home eNode B, a transmission point, or any other network node capable to serve a wireless device, such as a STA, user equipment or a machine type communication device in the wireless communications network 100. The network node 110 may support one or several communication technologies, and its name may depend on the technology and terminology used. In WLAN, the network node 110, which may be referred to as an AP, may be directly connected to one or more core networks, which are not depicted in FIG. 5 for the sake of simplicity.

The wireless communications network 100 covers a geographical area, which in some embodiments may be divided into cell areas, wherein each cell area is served by a network node, although, one network node may serve one or several cells. In the non-limiting example depicted in FIG. 5, the network node 110 serves a cell 130, which may typically be in unlicensed spectrum. The network node 110 may also serve one or more additional cells in licensed or unlicensed spectrum. This is not depicted in FIG. 5 for the sake of simplicity. The network node 110 may be of different classes, such as, e.g., macro eNodeB, home eNodeB or pico base station, based on transmission power and thereby also cell size. Typically, the wireless communications network 100 may comprise more cells similar to the cell 130, served by their respective network node. This is not depicted in FIG. 5 to simplify the Figure. In other examples than those depicted in FIG. 5, wherein the wireless communications network 100 is a non-cellular system, the network node 110 may serve receiving nodes with serving beams. The first communication device 101 may also be implemented in a so-called distributed manner, wherein the actions described herein as being performed by the first communication device 101 may actually be performed by one or more processors from different nodes communicating in the cloud. This is not represented in FIG. 5.

A wireless device 120 also referred to herein as a STA, a user equipment or UE is located in the wireless communications network 100. The wireless device 120 may e.g. a wireless communication device such as a UE which is also known as e.g., mobile terminal, wireless terminal and/or mobile station, a mobile telephone, cellular telephone, or laptop with wireless capability, just to mention some further examples. The wireless device 120 may be, for example, portable, pocket-storable, hand-held, computer-comprised, or a vehicle-mounted mobile device, enabled to communicate voice and/or data, via the RAN, with another entity, such as a server, a laptop, a PDA, or a tablet computer, sometimes referred to as a tablet with wireless capability, Machine-to-Machine (M2M) device, device equipped with a wireless interface, such as a printer or a file storage device, modem, or any other radio network unit capable of communicating over a wired or radio link in a communications system. The wireless device 120 is enabled to communicate wirelessly in the wireless communications network 100. The communication may be performed e.g., via a RAN and possibly one or more core networks, comprised within the wireless communications network 100.

The first communication device 101 is configured to communicate within the wireless communications network 100 with the second communication device 102 over a radio link 140 in the cell 130.

In some embodiments, the wireless communications network may further comprise a plurality of first communication devices 150 comprising the first communication device 101. Each of the first communication devices in the plurality of first communication devices 150 may have a similar description to that provided for the first communication device. For example, each of the first communication devices in the plurality of first communication devices 150 may be configured to communicate within the wireless communications network 100 with the second communication device 102 over a respective radio link in the cell 130, which is not depicted to simplify the Figure.

In general, the usage herein of "first", "second", and/or "third", may be understood to be an arbitrary way to denote different entities, and may be understood to not confer a cumulative or chronological character to the nouns they modify.

Figure 6:
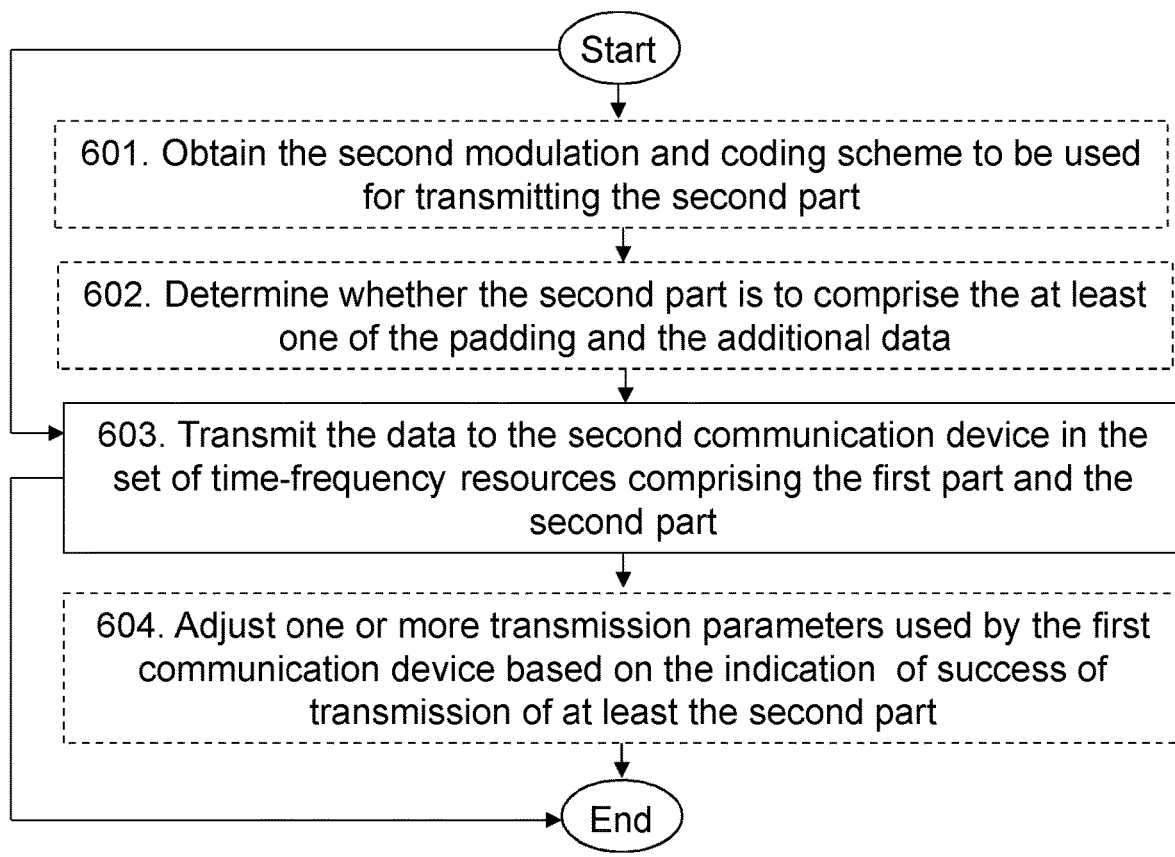
FIG. 6 is a flowchart depicting embodiments of a method in a first communication device, according to embodiments herein.

Embodiments of a method performed by the first communication device 101 for transmitting data to the second communication device 102, will now be described with reference to the flowchart depicted depicted in FIG. 6. The first communication device 101 and the second communication device 102 operate in the wireless communications network 100. The method may comprise the following actions, which actions may as well be carried out in another suitable order than that described below. In some embodiments, all actions may be performed. In other embodiments only one or fewer than all actions may be performed. In FIG. 6, optional actions are indicated with dashed boxes.

Action 601

Embodiments herein concern the context in which the first communication device 101 may need to transmit data to the second communication device 102 in a set of time-frequency resources that have a fixed duration, such as for example the UL MUPPDU, and wherein the data to be transmitted may not fill the whole duration of the time-frequency resources. The set of time-frequency resources are scheduled for transmission by the first communication device 101 to the second communication device 102. In such instances, the set of time-frequency resources comprise a first part and a second part. The first part comprises the data and has a shorter duration than the fixed duration of the set of time-frequency resources. The second part has a shorter duration than the duration of the set of time-frequency resources, which corresponds to a remaining duration of the fixed duration of the set of time-frequency resources.

In order to make a more efficient use of the time-frequency resources in the second part, the first communication device 101 may use a different MCS for the first part than that used for the second part. This is in order to be able to provide feedback, that is, channel knowledge, to the second communication device 102 on two different MCSs, and therefore allow either or both of the first communication device 101 and the second communication device 102 to perform link adaptation based on the feedback received from second communication device 102.

In most open loop link adaptations algorithms, e.g., Minstrel, the devices may choose a random MCS every now and then for exploratory purposes and gathering statistics on different MCS. This random MCS selection may not necessarily be based on the channel conditions, e.g., signal strength, Signal to Interference Noise Ratio (SINR), etc., but may have the purpose of probing a particular MCS. Once favorable statistics may have been collected for a particular MCS, the device may choose to switch to the said MCS for its transmissions. In some embodiments herein, the first communication device 101 may determine whether the data with second, new, MCS was transmitted successfully and use this to adjust its link adaptation algorithms. In this way, instead of using a useful data transmission for probing an MCS, and risking a transmission failure and the need of retransmission, the first communication device 101 may gather statistics on different MCSs based on probing with padding or additional data, which is transmitted anyhow.

In order for the first communication device 101 to use the second part of the set of time-frequency resources to obtain or provide feedback on a different MCS than a first MCS used in the first part, in this Action, the first communication device 101 may obtain a second MCS to be used for the transmitting of the second part described in Action 603. The second MCS may also be referred to herein as "$MCS_{padding}$", the first MCS may also be referred to herein as "$MCS_{data}$". The first communication device 101 may obtain the second MCS from at least one of: a) a memory in the first communication device 101, by retrieving the second MCS, b) the second communication device 102 or another communication device in the wireless communications network 100, by receiving the second MCS, and c) a determination by the first communication device 101, by autonomously calculating the second MCS.

The selection of the second MCS, used with the pattern, may be defined in a standard or configurable. For the latter case, the second communication device 102 may agree with a first communication device 101 to use a fixed MCS, or a varying MCS. If a varying MCS is to be applied with the second part, the second MCS used with the second part may be derived implicitly or explicitly. For implicit signaling of the second MCS, the second communication device 102 and the first communication device 101 may agree to use an MCS that depends on the data MCS. E.g., the second MCS may always be one MCS higher than the data MCS. Alternatively, the second MCS may be derived by operating a pre-defined calculation on the frame sequence number, e.g. according to the following formula:

$$MCS_{padding,i} = \lceil MCS_{max} \times sequencenumber_i/2^{12} \rceil.$$

In some examples, the first communication device 101 may use a higher order MCS as the second MCS to be able to send buffered data using the radio resources foreseen for the second part. In this case, additional data modulated with a more efficient but less robust MCS may be transmitted. The MCS to be used for transmitting data within the second part, which may also be referred to as "padding area", may be signalled implicitly or explicitly by the second communication device 102.

Implicit signalling of the MCS in use, that is, the second MCS, may occur through a default setting in a standard. An alternative method may be the selection as follows:

$$MCS_{padding,i} = MCS_{data,i} + \lceil (MCS_{max} - MCS_{data,i}) \times sequencenumber_i/2^{12} \rceil.$$

$MCS_{data,i}$ denotes MCS in use by the first part, also known as the "data portion" of MU-PPDU, $MCS_{max}$ denotes the most efficient MCS in use in this network, and $MCS_{padding,i}$ denotes the second MCS, to be used for the transmission of data, or padding, in radio resources foreseen for the second part.

For explicit signaling of the second MCS used by the first communication device 101, the second communication device 102 may send the second MCS used for padding use with separate message(s) or piggybacked to other messages. Alternatively, the second MCS to be used for transmitting data in radio resources foreseen for the second part may be signalled in beacon frames or the like.

In any of the embodiments herein, the set of time-frequency resources may be scheduled for simultaneous transmission, by the plurality of first communication devices 150 comprising the first communication device 101. The second communication device 102 may signal the second MCS to use for padding individually to any of the first communication devices in the plurality of first communication devices 110, or via a group addressed message.

According to the foregoing, in some embodiments, the second MCS may be determined, either by the first communication device 101 or by the second communication device 102, based on one of: a) the first MCS, and b) a frame sequence number of the set of time-frequency resources.

Action 602

In other embodiments herein, the first communication device 101 may have additional data buffered in its queue. However, the duration of the set of time-frequency resources may not be sufficient to carry such buffered data at the MCS agreed to be used. To make a more efficient use of the second part of the set of time-frequency resources, in this Action, the first communication device 101 may decide to transmit additional data the first communication device 101 may have in its buffer in the second part of the set of time-frequency resources. Accordingly, in this Action, the the first communication device 101 may determine whether the second part is to comprise at least one of: a) a padding and b) additional data. The determining in this Action 602 may be based on an amount of the additional data in the buffer of the first communication device 101. The additional data may be understood as data other than that in the first part.

The details of the pattern to be used for the second part may be determined according to a definition in a standard, or they may be configurable by e.g., the second communication device 102.

For embodiments wherein the pattern to be used for the second part may be configurable, the second communication device 102, e.g., an AP, may define a single pattern for the first communication devices in the plurality of first communication devices 150 it may serve, e.g., all STAs, or an individual pattern for each of the first communication devices in the plurality of first communication devices 110. The second communication device 102 may then signal the pattern as group addressed or individually addressed message to the plurality of first communication devices 150.

Action 603

In this Action, the first communication device 101 transmits the data to the second communication device 102. The data is comprised in the set of time-frequency resources scheduled for transmission by the first communication device 101 to the second communication device 102. As mentioned earlier, the set of time-frequency resources have a fixed duration. The set of time-frequency resources comprise the first part comprising the data, the first part having a shorter duration than the fixed duration of the set of time-frequency resources. The transmitting of the data in the first part is performed with the first MCS. The set of time-frequency resources also comprise the second part having the remaining duration of the fixed duration of the set of time-frequency resources. The second part comprises at least one of: the padding, and the additional data from the first communication device 101, as may have been determined in Action 602. In some examples, the second part may comprise padding, and in some examples, the second part may comprise the additional data. The transmitting in this Action 603 further comprises transmitting the at least one of: the padding and the additional data, with a second MCS, wherein the second MCS is different than the first MCS.

This Action may be performed via, e.g., the radio link 140. The transmitting may be performed using at least one of: MIMO transmission and OFDMA.

In any of the embodiments wherein the set of time-frequency resources may be scheduled for simultaneous transmission by the plurality of first communication devices 150, each of the first communication devices in the plurality of first communication devices 150 may be scheduled in the set of time-frequency resources in one of: a) a different subset of frequencies; b) a different stream; and c) a different beam.

Action 604

After having transmitted the set of time-frequency resources to the second communication device 102, the second communication device 102 may decode the second part with the second MCS, or at the different MCS in the second part has been transmitted by the plurality of first communication devices 150, and via a pre-known pattern, the second communication device 102 may be able to calculate a bit error ratio. The second communication device 102 may signal the result of this bit error calculation or bit error ration calculated over the current and several previous second parts to the transmitting plurality of first communication devices 150.

According to the foregoing, the first communication device 101 may receive an indication of a success of transmission of at least the second part of the set of time-frequency resources with the second MCS, the indication being received from the second communication device 102.

To take advantage of this received information, in this Action, the first communication device 101 may adjust one or more transmission parameters used by the first communication device 101 based on the received indication. In other words, the first communication device 101 may perform link adaptation based on the feedback received from the second communication device 102 on the transmission with the first MCS, and the second MCS. For example, if the reception of the second part with the second MCS was more successful, that is, the padding or the additional data were received with fewer errors by the second communication device, than data received with the first MCS, the first communication device 101 may decide to use the second MCS for future transmissions to e.g., the second communication device 102.

Figure 7:
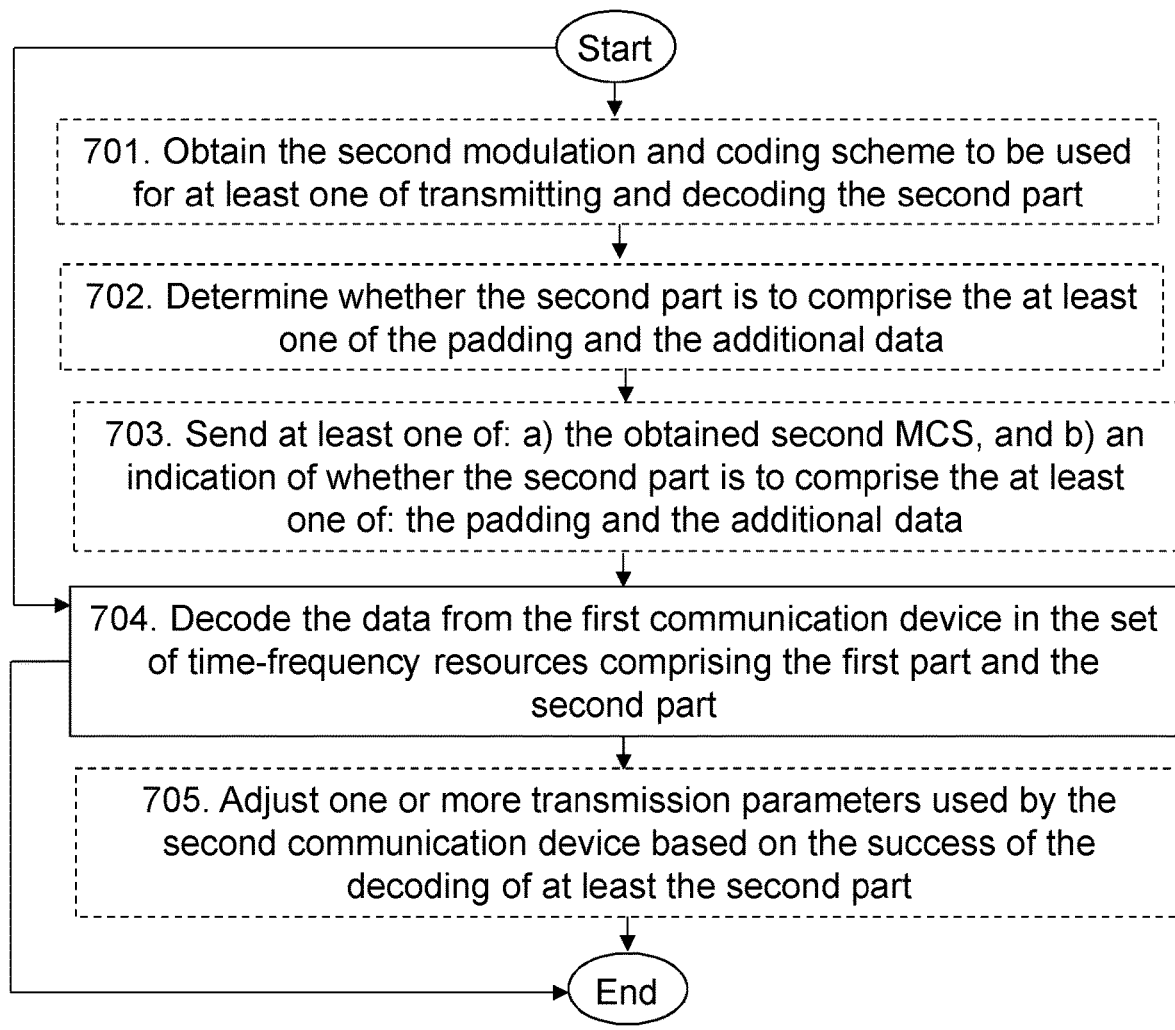
FIG. 7 is a schematic diagram illustrating an example of embodiments of a method in a second communication device, according to embodiments herein.

Embodiments of a method performed by the second communication device 102 for adjusting the one or more transmission parameters, will now be described with reference to the flowchart depicted in FIG. 7. As stated earlier, the second communication device 102 operates in the wireless communications network 100.

The detailed description of some of the following corresponds to the same references provided above, in relation to the actions described for the first communication device 101, and will thus not be repeated here.

Action 701

In order to provide the second MCS to the first communication device 101, as explained in Action 601 above, in this Action, second communication device 102 may obtain the second MCS to be used for the at least one of: the transmission by the first communication device 101 of the second part, and a decoding, by the second communication device 102, of the second part, which decoding will be described in Action 703. The obtaining of the second MCS in this Action 701 may be from at least one of the following four options. In a first option, the second communication device 102 may obtain the second MCS from a memory in the second communication device 102, that is, by retrieving the second MCS from a memory. In a second option, the second communication device 102 may obtain the second MCS from the first communication device 101 or another communication device in the wireless communications network 100. In a third option, the second communication device 102 may obtain the second MCS from a determination by the second communication device 102. And in a fourth option, the second communication device 102 may obtain the second MCS from historical data collected by the second communication device 102 on a probability of successful transmission based on the first MCS and the second MCS.

In any of the second and third options, the second MCS may be determined based on one of: a) the first MCS, and b) the frame sequence number of the set of time-frequency resources.

As stated earlier, the set of time-frequency resources may be scheduled for simultaneous transmission, by the plurality of first communication devices 150 comprising the first communication device 101. Such may be the case for UL MU transmissions. For the UL MU transmissions, the first MCS to be used for the data in the first part may be suggested by the second communication device 102, e.g., as part of the TF. The second communication device 102 may then need to keep a MCS log for each first communication device in the plurality of first communication devices 150 in its population, so that it may suggest an adequate first MCS for the UL MU data transmission in the first part. In the general case, the first MCS determination at the second communication device 102 may be based on the assumption of channel reciprocity and examining the success rate of DL transmissions, from the second communication device 102 to each first communication device in the plurality of first communication devices 150. Even though this may be a rather simple operation, the channel may not always be reciprocal, and changing channel conditions may lead to inaccurate estimations. Therefore, in another example of embodiments herein, the second communication device 102 may use the gathered MCS statistics from the padded data to enhance its first MCS suggestions for the different first communication devices in the plurality of first communication devices 150 in the UL MU transmissions.

The second communication device 102 may otherwise obtain the second MCS in a similar way as described earlier in Action 601.

Action 702

In this Action, the second communication device 102, determines whether the second part is to comprise the at least one of: the padding and the additional data. The determining in this Action 702 may be based on an amount of the additional data in a buffer of the first communication device 101.

The second communication device 102 perform the determination in this Action in a similar way as described earlier in Action 602.

Action 703

In this Action, the second communication device 102 may send, to the first communication device 101, at least one of: a) the obtained second MCS, and b) an indication of whether the second part is to comprise the at least one of: the padding and the additional data, as determined by the second communication device 102 in Action 702.

The sending in this Action may be performed, via e.g., the radio link 140.

The sending in this Action may be performed with explicit signalling. With such signalling, the second communication device 102 may force the first communication device 101 to encode data for use for with the radio resources foreseen for padding in the second part, at a dedicated MCS. This explicit signalling may be piggyback to other messages sent to the second communication device 102, or the signalling may be in separate frame transmissions.

Action 704

In this Action, the second communication device 102, decodes the data received from the first communication device 101 operating in the wireless communications network 100. The data is comprised in the set of time-frequency resources scheduled for transmission to the second communication device 102. The set of time-frequency resources has a fixed duration. The set of time-frequency resources comprises the two parts described earlier. The first part comprises the data. The first part has a shorter duration than the fixed duration of the set of time-frequency resources. The decoding in this Action 704 of the data in the first part is performed according to the first MCS. The second part has the remaining duration of the fixed duration of the set of time-frequency resources. The second part comprises at least one of: the padding, and the additional data from the first communication device 101. The decoding this Action 704 further comprises decoding said at least one of: the padding and the additional data, with the second MCS, the second MCS being different than the first MCS.

The data and the respective one of: padding and additional data may be received using at least one of: MIMO transmission and OFDMA.

As stated earlier, the second communication device 102 may decode the second part at the second MCS, and via the pre-known pattern, the second communication device 102 may be able to calculate a bit error ratio. The second communication device 102 may then signal the result of this bit error calculation or bit error ratio calculated over the current and several previous paddings to the first communication device 101, or to the first communication devices in the plurality of first communication devices 150, e.g., the transmitting STAs. This signalling may occur explicit in a dedicated frame transmission or implicit embedded as information (element) in other transmission destined to the previously transmitting first communication devices in the plurality of first communication devices 150.

Also as stated earlier, the set of time-frequency resources may be scheduled for simultaneous transmission, by the plurality of first communication devices 150 comprising the first communication device 101. In such embodiments, the data may be received from the plurality of first communication devices 150. Each first communication device in the plurality of first communication devices 150 may be scheduled in a respective subset of the set of time-frequency resources. Each respective subset may have a respective first part. Respective may be understood herein that each first communication device may have its own. In this case, its own first part and its own second part in the set of time-frequency resources. The decoding in this Action 704 may further comprise decoding the data received from the plurality of first communication devices 150. For each first communication device in the plurality of first communication devices 150 having respective data in the respective first part with a respective duration shorter than the fixed duration of the set of time-frequency resources: a) the decoding of the respective data in the respective first part may be performed according to a respective first MCS, and b) the respective subset of the set of time-frequency resources has a respective second part, the respective second part may have a respective remaining duration of the fixed duration of the set of time-frequency resources. The respective second part may further comprise at least one of: a respective padding and respective additional data. The decoding in this Action 704 may further comprise decoding said at least one of: the respective padding and the respective additional data, with a respective second MCS, the respective second MCS being different than the respective first MCS. The adjusting in this Action 705 may be further performed for transmission to each first communication device in the plurality of first communication devices 150 having respective data in the respective first part with a respective duration shorter than the fixed duration of the set of time-frequency resources based on a respective success of the decoding 704 of the respective second part with the respective second MCS. In other words, in embodiments wherein the set of time-frequency resources may be scheduled for simultaneous transmission, by the plurality of first communication devices 150, the second MCS may be determined on a per first communication device basis. The adjusting may also be performed on a per first communication device basis. For each first communication device in the plurality of first communication devices 150, the procedure followed may be the same as that described for the first communication device 101.

Each of the first communication devices in the plurality of first communication devices 150 may be scheduled in the set of time-frequency resources in one of: a) a different subset of frequencies; b) a different stream; and c) a different beam.

A particular example of the set of time-frequency resources is a MU-PPDU.

The decoding in this Action may otherwise be performed according to known methods.

Action 705

In this Action, the second communication device 102 may, adjust the one or more transmission parameters used by the second communication device 102 based on a success of the decoding 704 of the second part with the second MCS. As before, to adjust the one or more transmission parameters may be understood as performing link adaptation. The success of the decoding 704 of the second part with the second MCS may be understood as the result of the bit error calculation or bit error ratio calculated over the current and several previous paddings described in Action 704.

In some examples of embodiments herein, when the useful data in the first part and the second part may be received by the second communication device 102, the second communication device 102 may collect statistics on the probability of successful transmission based on the first MCS and the second MCS used. Since the second MCS is different than the one used for the first part of the packet, the second communication device 102 may gather statistics in a better fashion. The second communication device 102 may then adjust the one or more transmission parameters according to this Action, based on the gathered statistics.

To summarize the above in other words, through embodiments herein, the first communication device 101 may make use of the radio resources, transmission duration and transmission bandwidth, foreseen for padding. In 802.11ax, padding is inserted at the end of a PPDU. According to embodiments herein, the padding radio resources may be reused in two different manners. In a first manner, a station may transmit a known pattern at a more efficient but less robust MCS in the radio resources foreseen for padding. The decoding of a known pattern may aid the receiver in optimizing its MCS selection. In a second manner, a station may use a more efficient but less robust MCS to carry a packet in the radio resources foreseen for padding.

An advantage of embodiments herein is that they help to improve the overhead of the existing padding procedure, by making use of the transmitted padded data. Instead of transmitting padded data that may be discarded at the receiver, embodiments herein enable to perform a new padding procedure, where the padded data may be used for additional data transmission.

A further advantage of embodiments herein is that they also help to carry out link adaptation by enabling an AP to get periodic feedback on different MCSs. Hence, the link adaptation algorithm may be adjusted by probing different MCSs.

As consequence of both of the foregoing advantages, transmission efficiency, in terms of data throughput, is improved, and.

Figure 8:
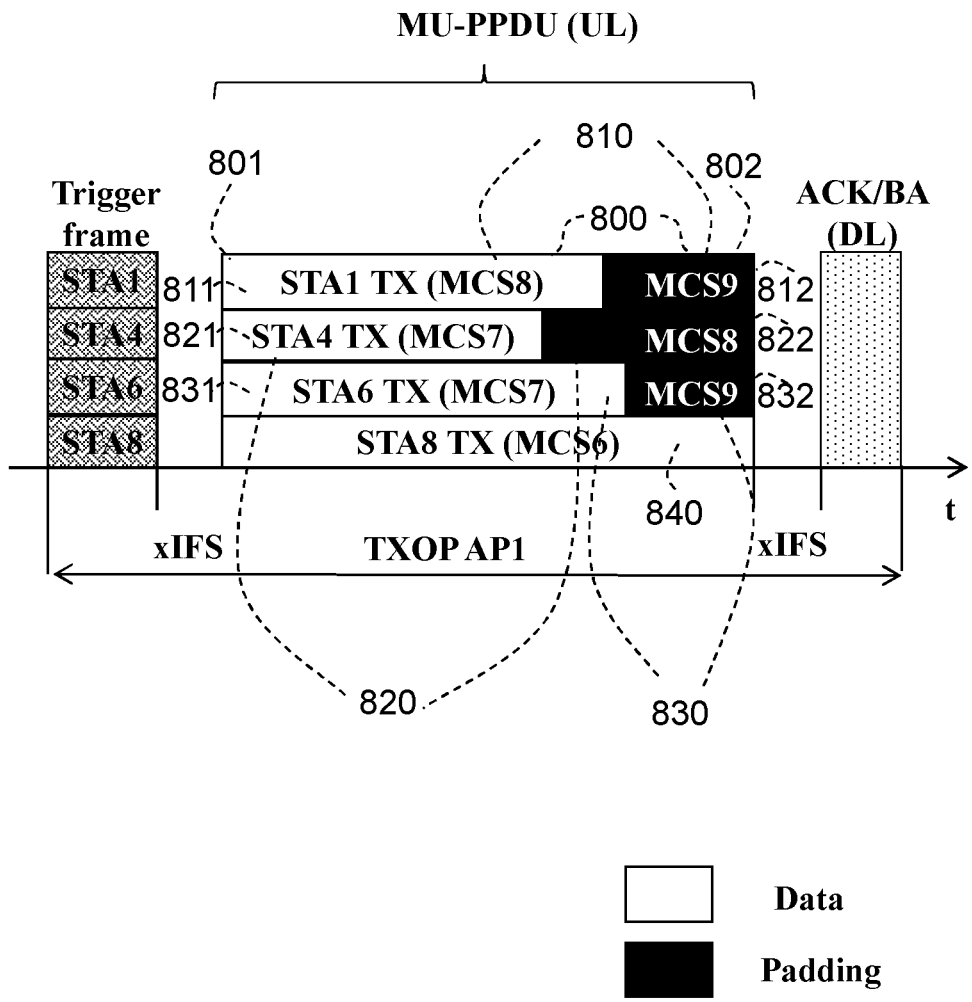
FIG. 8 is a schematic diagram illustrating an example of 802.11ax transmission with padding, according to embodiments herein.

FIG. 8 is a schematic diagram illustrating a non-limiting example of embodiments herein, wherein the set of time-frequency resources 800 is a MU-PPDU. As illustrated in the Figure, the padding procedure of existing methods is replaced with a new procedure that uses a specific MCS for the transmission of the padded portion of the PPDU. The first communication device 101 is STA1. The set of time-frequency resources 800 comprises the first part 801 and the second part 802. The second communication device 102 is an AP, AP1. In this example, the set of time-frequency resources 800 are scheduled for simultaneous transmission by the first communication devices in the plurality of first communication devices 150, which in this example are STAs 1 (STA1), 4 (STA4), 6 (STA6) and 8 (STA8). Each first communication device in the plurality of first communication devices 150 is configured to be scheduled in the respective subset 810, 820, 830, 840 of the set of time-frequency resources 800, which correspond to every one of the four rows in the MU-PDDU. In this example, the respective subset 810 of the set of time-frequency resources 801 for the first communication device 101, STA1, is indicated. Also, the respective first part 811, and the respective second part 812 for the first communication device 101, STA1, the respective first part 821, and the respective second part 822 for the STA4, and the respective first part 831, and the respective second part 832 for the STA6 are indicated. In this non-limiting example, STAs 1, 4, and 6 have packets buffered, but are not able to send the packets, as the radio resources foreseen for padding in the second part are insufficient to carry the buffered packets at the first modulation and coding scheme (MCS) currently in use. Instead of filling the respective second part 812, 822, 832 with an arbitrary pattern, the STAs use, for the respective second part 812, 822, 832, that is, the "padding portion of the packet", the respective second MCS, which is an MCS different than the respective one used for the respective first part 811, 821, 831, for the "data portion", the respective first MCS. To aid in MCS selection, STAs 1, 4, and 6 may use a more efficient, less robust MCS to encode the second part. In the example in FIG. 8, STAs 1, 4, and 6 use MCS8, MCS7, and MCS7 for data transmission in the respective first part 811, 821, 831, and MCS9, MCS8 and MCS9, respectively, for transmission of the respective second part 812, 822, 832, which in this example is padding. The description of the Figure otherwise corresponds to that provided in FIG. 4. STA8 transmits its data in its respective subset 840 for a duration of time corresponding to the fixed duration of the set of time-frequency resources 800. STA8 uses only one MCS, MCS6, for transmission.

In an alternative embodiment not illustrated in this Figure, STAs 1, 4, and 6 may have additional data buffered in their queues. However, the duration of the MU-PPDU is not sufficient to carry such buffered data at the MCS agreed to be used. In such embodiments, STAs 1, 4, and 6 may transmit their respective additional data in the second part, with their respective second MCS.

To perform the method actions described above in relation to FIG. 6, the first communication device 101 is configured to transmit data to the second communication device 102. The first communication device 101 may comprise the following arrangement depicted in FIG. 9. As already mentioned, the first communication device 101 and the second communication device 102 are configured to operate in the wireless communications network 100.

The detailed description of some of the following corresponds to the same references provided above, in relation to the actions described for the first communication device 101, and will thus not be repeated here. For example, to transmit may be configured to be performed using at least one of: MIMO transmission and OFDMA.

The first communication device 101 is configured to, e.g., by means of a transmitting module 901 configured to, transmit the data to the second communication device 102. The data is configured to be comprised in the set of time-frequency resources 800 scheduled for transmission by the first communication device 101 to the second communication device 102. The set of time-frequency resources 800 are configured to have the fixed duration. The set of time-frequency resources 800 is further configured to comprise the first part 801 and the second part 802. The first part 801 is configured to comprise the data. The first part 801 is configured to have a shorter duration than the fixed duration of the set of time-frequency resources 800. To transmit the data in the first part 801 is configured to be performed with the first MCS. The second part 802 is configured to have the remaining duration of the fixed duration of the set of time-frequency resources 800. The second part 802 is configured to comprise at least one of: the padding, and the additional data from the first communication device 101. To transmit is further configured to comprise to transmit said at least one of: the padding and the additional data, with the second MCS. The second MCS is different than the first MCS.

In some embodiments, the set of time-frequency resources 800 may be configured to be scheduled for simultaneous transmission, by the plurality of first communication devices 150 comprising the first communication device 101.

The first communication device 101 may be further configured to, e.g., by means of an adjusting module 902 configured to, adjust the one or more transmission parameters configured to be used by the first communication device 101 based on the indication of the success of transmission of at least the second part 802 with the second MCS. The indication may be configured to be received from the second communication device 102.

The first communication device 101 may be further configured to, e.g., by means of an obtaining module 903 configured to, obtain the second MCS configured to be used for the transmitting of the second part 802 from at least one of: a) the memory in the first communication device 101, b) the second communication device 102 or another communication device in the wireless communications network 100, and c) the determination by the first communication device 101.

The second MCS may be configured to be determined based on one of: a) the first MCS, and b) the frame sequence number of the set of time-frequency resources 800.

The first communication device 101 may be further configured to, e.g., by means of a determining module 904 configured to, determine whether the second part 802 is to comprise the at least one of the padding and the additional data. To determine may be configured to be based on the amount of the additional data in the buffer of the first communication device 101.

Each of the first communication devices in the plurality of first communication devices 150 may be configured to be scheduled in the set of time-frequency resources 800 in the one of: a) the different subset of frequencies; b) the different stream; and c) the different beam.

The first communication device 101 may comprise an interface unit to facilitate communications between the first communication device 101 and other nodes or devices, e.g., the second communication device 102. The interface may, for example, include a transceiver configured to transmit and receive radio signals over an air interface in accordance with a suitable standard.

Figure 9:
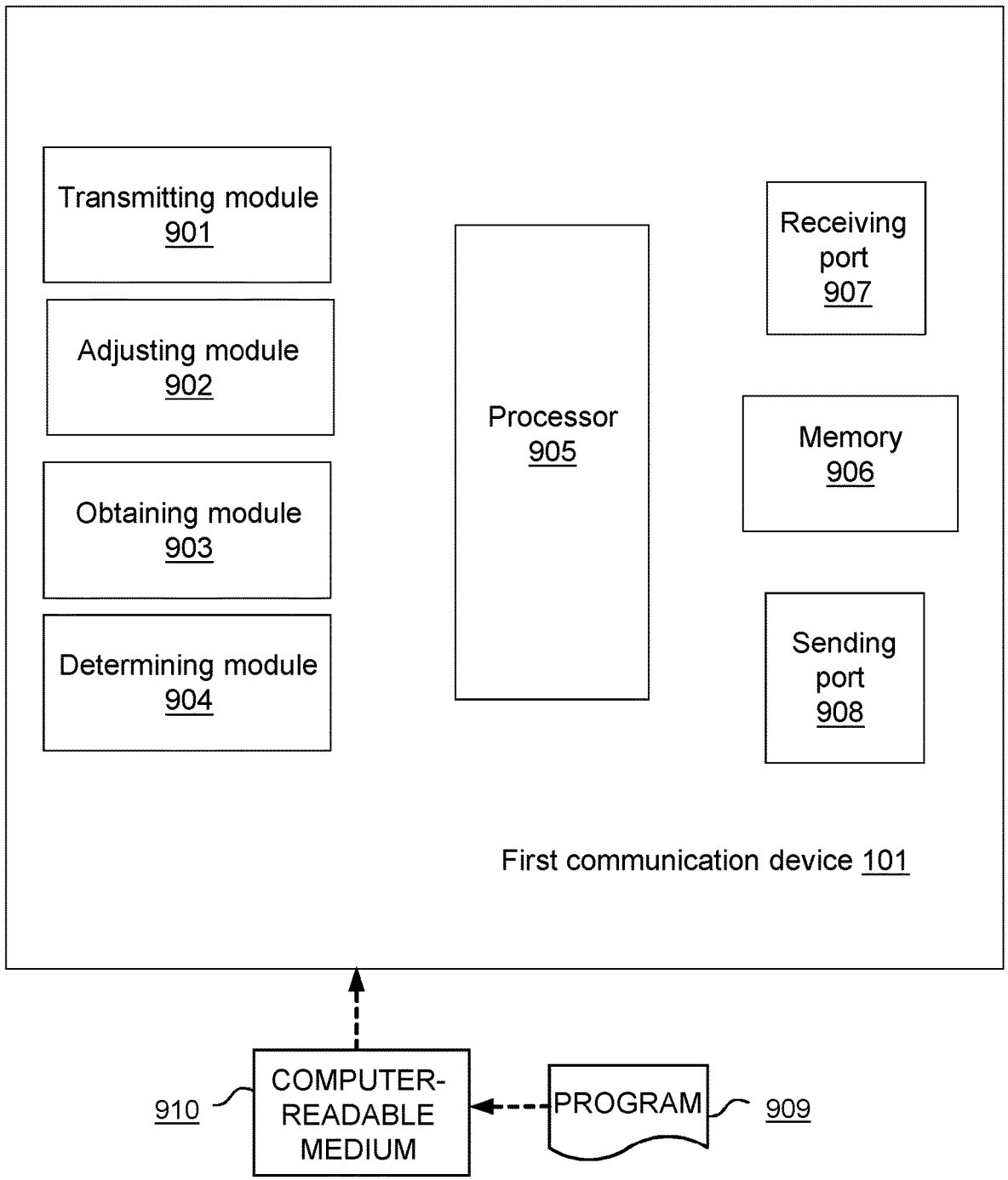
FIG. 9 is a schematic block diagram illustrating embodiments of a first communication device, according to embodiments herein.

The embodiments herein may be implemented through one or more processors, such as the processor 905 in the first communication device 101 depicted in FIG. 9, together with computer program code for performing the functions and actions of the embodiments herein. The program code mentioned above may also be provided as a computer program product, for instance in the form of a data carrier carrying computer program code for performing the embodiments herein when being loaded into the in the first communication device 101. One such carrier may be in the form of a CD ROM disc. It is however feasible with other data carriers such as a memory stick. The computer program code may furthermore be provided as pure program code on a server and downloaded to the first communication device 101. The computer program code may also be provided as a service from the cloud.

The first communication device 101 may further comprise a memory 906 comprising one or more memory units. The memory 906 is arranged to be used to store obtained information, store data, configurations, schedulings, and applications etc. to perform the methods herein when being executed in the first communication device 101.

In some embodiments, the first communication device 101 may receive information from, e.g., the second communication device 102, through a receiving port 907. In some embodiments, the receiving port 907 may be, for example, connected to one or more antennas in first communication device 101. In other embodiments, the first communication device 101 may receive information from another structure in the wireless communications network 100 through the receiving port 907. Since the receiving port 907 may be in communication with the processor 905, the receiving port 907 may then send the received information to the processor 905. The receiving port 907 may also be configured to receive other information.

The processor 905 in the first communication device 101 may be further configured to transmit or send information to e.g., the second communication device 102, through a sending port 908, which may be in communication with the processor 905, and the memory 906.

Those skilled in the art will also appreciate that the transmitting module 901, the adjusting module 902, the obtaining module 903, and the determining module 904 described above may refer to a combination of analog and digital modules, and/or one or more processors such as the processor 905 configured with software and/or firmware, e.g., stored in the memory 906, that, when executed by the one or more processors such as the processor 905, perform the methods as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 901-904 described above may be implemented as one or more applications running on one or more processors such as the processor 905.

Thus, the methods according to the embodiments described herein for the first communication device 101 may be respectively implemented by means of a computer program 909 product, comprising instructions, i.e., software code portions, which, when executed on at least one processor 905, cause the at least one processor 905 to carry out the actions described herein, as performed by the first communication device 101. The computer program 909 product may be stored on a computer-readable storage medium 910. The computer-readable storage medium 910, having stored thereon the computer program 909, may comprise instructions which, when executed on at least one processor 905, cause the at least one processor 905 to carry out the actions described herein, as performed by the first communication device 101. In some embodiments, the computer-readable storage medium 910 may be a non-transitory computer-readable storage medium 910, such as a CD ROM disc, or a memory stick. In other embodiments, the computer program 909 product may be stored on a carrier containing the computer program just described, wherein the carrier is one of an electronic signal, optical signal, radio signal, or the computer-readable storage medium, as described above.

To perform the method actions described above in relation to FIG. 7, the second communication device 102 is configured to adjust the one or more transmission parameters. The second communication device 102 may comprise the following arrangement depicted in FIG. 10. As already mentioned, the second communication device 102 is further configured to operate in the wireless communications network 100.

The detailed description of some of the following corresponds to the same references provided above, in relation to the actions described for the second communication device 102, and will thus not be repeated here. For example, the data and the respective one of: the padding and the additional data may be configured to be received using at least one of: MIMO transmission and OFDMA.

The second communication device 102 is configured to, e.g., by means of a decoding module 1001 configured to, receive, decode the data configured to be received from the first communication device 101 configured to operate in the wireless communications network 100. The data is configured to be comprised in the set of time-frequency resources 800 configured to be scheduled for transmission to the second communication device 102. The set of time-frequency resources 800 is configured to have the fixed duration. The set of time-frequency resources 800 comprises the first part 801 and the second part 802. The first part 801 is configured to comprise the data. The first part 801 is configured to have the shorter duration than the fixed duration of the set of time-frequency resources 800. To decode the data in the first part 801 is configured to be performed according to the first MCS. The second part 802 is configured to have the remaining duration of the fixed duration of the set of time-frequency resources 800. The second part 802 is configured to comprise the at least one of: may padding, and the additional data from the first communication device 101. To decode further comprises to decode said at least one of: the padding and the additional data, with the second MCS. The second MCS is different than the first MCS.

In some embodiments, the set of time-frequency resources 800 may be configured to be scheduled for simultaneous transmission, by the plurality of first communication devices 150 comprising the first communication device 101. Each of the first communication devices in the plurality of first communication devices 150 may be configured to be scheduled in the set of time-frequency resources 800 in one of: a) a different subset of frequencies; b) a different stream; and c) a different beam.

The second communication device 102 is further configured to, e.g., by means of an adjusting module 1002 configured to, adjust the one or more transmission parameters configured to be used by the second communication device 102 based on the success of the decoding of the second part 802 with the second MCS.

The second communication device 102 may be further configured to, e.g., by means of an obtaining module 1003 configured to, obtain the second MCS to be used for the at least one of: the transmission by the first communication device 101 of the second part 802, and the decoding of the second part 802. To obtain is configured to be from at least one of: a) the memory in the second communication device 102, b) the first communication device 101 or another communication device in the wireless communications network 100, c) the determination by the second communication device 102, and d) the historical data collected by the second communication device 102 on the probability of successful transmission based on the first MCS and the second MCS.

The second communication device 102 may be further configured to, e.g., by means of a determining module 1004 configured to, determine whether the second part 802 is to comprise the at least one of: the padding and the additional data, to determine being configured to be based on the amount of the additional data in the buffer of the first communication device 101.

The second MCS may be configured to be determined based on the one of: a) the first MCS, and b) the frame sequence number of the set of time-frequency resources 800.

The second communication device 102 is further configured to, e.g., by means of an sending module 1005 configured to, send, to the first communication device 101, the at least one of: a) the obtained second MCS, and b) the indication of whether the second part 802 is to comprise the at least one of: the padding and the additional data, as determined by the second communication device 102.

In some embodiments, the data may be configured to be received from the plurality of first communication devices 150. Each first communication device in the plurality of first communication devices 150 may be configured to be scheduled in the respective subset 810, 820, 830 of the set of time-frequency resources 800. Each respective subset may be configured to have the respective first part 811, 821, 831. To decode may be further configured to comprise decoding the data configured to be received from the plurality of first communication devices 150. For each first communication device in the plurality of first communication devices 150 having respective data in the respective first part 811, 821, 831, with the respective duration shorter than the fixed duration of the set of time-frequency resources 800: a) the decoding of the respective data in the respective first part 811, 821, 831 may be configured to be performed according to a respective first MCS, and b) the respective subset 810, 820, 830 is further configured to have a respective second part 812, 822, 832, and the respective second part 812, 822, 832 may have the respective remaining duration of the fixed duration of the set of time-frequency resources 800. The respective second part 812, 822, 832 may further comprise at least one of: the respective padding and the respective additional data. To decode may be further configured to comprise to decode said at least one of: the respective padding and the respective additional data, with the respective second MCS. The respective second MCS may be different than the respective first MCS. To adjust may be further configured to be performed for the transmission to each first communication device in the plurality of first communication devices 150 having the respective data in the respective first part 811, 821, 831 with the respective duration shorter than the fixed duration of the set of time-frequency resources 800 based on the respective success of the decoding of the respective second part 812, 822, 832 with the respective second MCS.

The second communication device 102 may comprise an interface unit to facilitate communications between the second communication device 102 and other nodes or devices, e.g., the first communication device 101. The interface may, for example, include a transceiver configured to transmit and receive radio signals over an air interface in accordance with a suitable standard.

Figure 10:
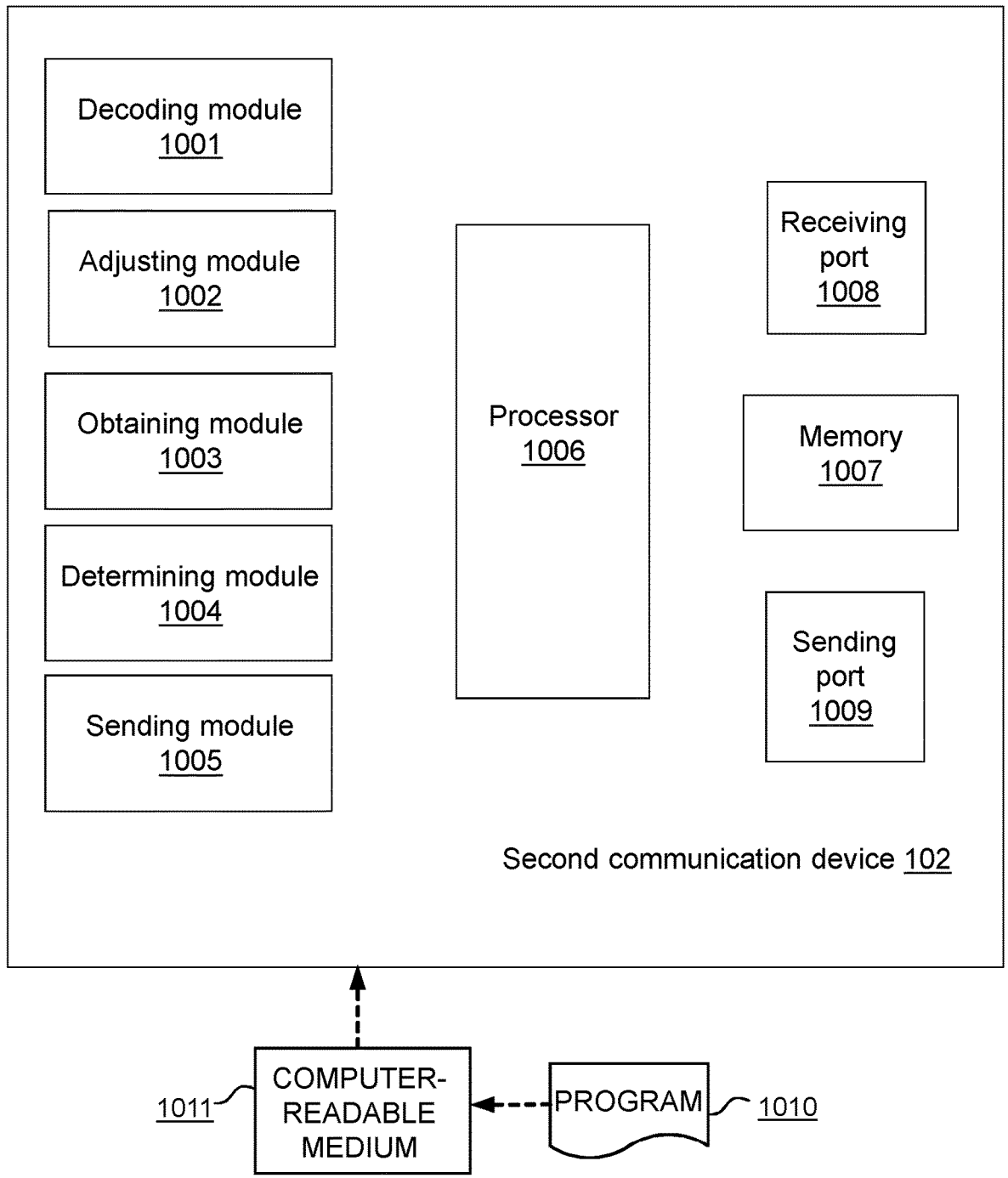
FIG. 10 is a schematic block diagram illustrating embodiments of a second communication device, according to embodiments herein.

The embodiments herein may be implemented through one or more processors, such as the processor 1006 in the second communication device 102 depicted in FIG. 10, together with computer program code for performing the functions and actions of the embodiments herein. The program code mentioned above may also be provided as a computer program product, for instance in the form of a data carrier carrying computer program code for performing the embodiments herein when being loaded into the in the second communication device 102. One such carrier may be in the form of a CD ROM disc. It is however feasible with other data carriers such as a memory stick. The computer program code may furthermore be provided as pure program code on a server and downloaded to the second communication device 102. The computer program code may also be provided as a service from the cloud.

The second communication device 102 may further comprise a memory 1007 comprising one or more memory units. The memory 1007 is arranged to be used to store obtained information, store data, configurations, schedulings, and applications etc. to perform the methods herein when being executed in the second communication device 102.

In some embodiments, the second communication device 102 may receive information from, e.g., the first communication device 101, through a receiving port 1008. In some embodiments, the receiving port 1008 may be, for example, connected to one or more antennas in second communication device 102. In other embodiments, the second communication device 102 may receive information from another structure in the wireless communications network 100 through the receiving port 1008. Since the receiving port 1008 may be in communication with the processor 1006, the receiving port 1008 may then send the received information to the processor 1006. The receiving port 1008 may also be configured to receive other information.

The processor 1006 in the second communication device 102 may be further configured to transmit or send information to e.g., the first communication device 101, through a sending port 1009, which may be in communication with the processor 1006, and the memory 1007.

Those skilled in the art will also appreciate that the decoding module 1001, the adjusting module 1002, the obtaining module 1003, the determining 1004 and the sending module 1005 described above may refer to a combination of analog and digital modules, and/or one or more processors, such as the processor 1006, configured with software and/or firmware, e.g., stored in the memory 1007, that, when executed by the one or more processors such as the processor 1006, perform the methods as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1301-1305 described above may be implemented as one or more applications running on one or more processors such as the processor 1006.

Thus, the methods according to the embodiments described herein for the second communication device 102 may be respectively implemented by means of a computer program 1010 product, comprising instructions, i.e., software code portions, which, when executed on at least one processor 1006, cause the at least one processor 1006 to carry out the actions described herein, as performed by the second communication device 102. The computer program 1010 product may be stored on a computer-readable storage medium 1011. The computer-readable storage medium 1011, having stored thereon the computer program 1010, may comprise instructions which, when executed on at least one processor 1006, cause the at least one processor 1006 to carry out the actions described herein, as performed by the second communication device 102. In some embodiments, the computer-readable storage medium 1011 may be a non-transitory computer-readable storage medium 1011, such as a CD ROM disc, or a memory stick. In other embodiments, the computer program 1010 product may be stored on a carrier containing the computer program just described, wherein the carrier is one of an electronic signal, optical signal, radio signal, or the computer-readable storage medium, as described above.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

The invention claimed is:

1. A method performed by a first communication device for transmitting data to a second communication device, the first communication device and the second communication device operating in a wireless communications network, the method comprising:
   transmitting the data to the second communication device, the data being comprised in a set of time-frequency resources scheduled for transmission by the first communication device to the second communication device, the set of time-frequency resources having a fixed duration, and the set of time-frequency resources comprising:
   a first part comprising the data, the first part having a shorter duration than the fixed duration of the set of time-frequency resources, and wherein the transmitting of the data in the first part is performed with a first modulation and coding scheme, MCS, and
   a second part having a remaining duration of the fixed duration of the set of time-frequency resources, the second part comprising at least one of a padding or additional data from the first communication device, and wherein the transmitting further comprises transmitting said at least one of the padding or the additional data with a second MCS, the second MCS being different than the first MCS,
   wherein the set of time-frequency resources are scheduled for simultaneous transmission, by a plurality of communication devices including the first communication device,
   and the remaining duration of the second part enables the set of time-frequency resources for the plurality of communication devices to finish at a same time.

2. The method according to claim 1, further comprising:
   adjusting one or more transmission parameters used by the first communication device based on an indication of a success of transmission of at least the second part with the second MCS, the indication being received from the second communication device.

3. The method according to claim 1, further comprising:
   obtaining the second MCS to be used for the transmitting of the second part from at least one of:
   a memory in the first communication device,
   the second communication device or another communication device in the wireless communications network, and
   a determination by the first communication device.

4. The method according to claim 3, wherein the second MCS is determined based on one of the first MCS or a frame sequence number of the set of time-frequency resources.

5. The method according to claim 1, further comprising:
   determining whether the second part is to comprise the at least one of the padding or the additional data, the determining being based on an amount of the additional data in a buffer of the first communication device.

6. A method performed by a second communication device for adjusting one or more transmission parameters, the second communication device operating in a wireless communications network, the method comprising:

decoding data received from a first communication device operating in the wireless communications network, the data being comprised in a set of time-frequency resources scheduled for transmission to the second communication device, the set of time-frequency resources having a fixed duration, and the set of time-frequency resources comprising:
a first part comprising the data, the first part having a shorter duration than the fixed duration of the set of time-frequency resources, and wherein the decoding of the data in the first part is performed according to a first MCS, and
a second part having a remaining duration of the fixed duration of the set of time-frequency resources, the second part comprising at least one of a padding, or additional data from the first communication device, and wherein the decoding further comprises decoding said at least one of the padding or the additional data with a second MCS, the second MCS being different than the first MCS; and
adjusting one or more transmission parameters used by the second communication device based on a success of the decoding of the second part with the second MCS, wherein the set of time-frequency resources are scheduled for simultaneous transmission, by a plurality of communication devices including the first communication device,
and the remaining duration of the second part enables the set of time-frequency resources for the plurality of communication devices to finish at a same time.

7. The method according to claim 6, further comprising at least one of the following actions:
obtaining the second MCS to be used for at least one of transmission of the second part by the first communication device or the decoding of the second part, the obtaining being from at least one of:
a memory in the second communication device;
the first communication device or another communication device in the wireless communications network;
a determination by the second communication device; or
historical data collected by the second communication device on a probability of successful transmission based on the first MCS and the second MCS; or
determining whether the second part is to comprise the at least one of the padding or the additional data, the determining being based on an amount of the additional data in a buffer of the first communication device.

8. The method according to claim 7, further comprising sending, to the first communication device, at least one of:
the obtained second MCS; or
an indication of whether the second part is to comprise the at least one of the padding or the additional data, as determined by the second communication device.

9. A first communication device configured to transmit data to a second communication device, the first communication device and the second communication device being configured to operate in a wireless communications network, the first communication device comprising:
a processor and a memory, wherein the memory stores instructions that are executable by the processor whereby the first communication device is configured to transmit the data to the second communication device, the data being comprised in a set of time-frequency resources scheduled for transmission by the first communication device to the second communication device, the set of time-frequency resources having a fixed duration, and the set of time-frequency resources comprising:
a first part comprising the data, the first part having a shorter duration than the fixed duration of the set of time-frequency resources, and wherein the transmitting of the data in the first part is performed with a first modulation and coding scheme, MCS, and
a second part having a remaining duration of the fixed duration of the set of time-frequency resources, the second part comprising at least one of a padding or additional data from the first communication device, and wherein the transmitting further comprises transmitting said at least one of the padding or the additional data with a second MCS, the second MCS being different than the first MCS,
wherein the set of time-frequency resources are scheduled for simultaneous transmission, by a plurality of communication devices including the first communication device,
and the remaining duration of the second part enables the set of time-frequency resources for the plurality of communication devices to finish at a same time.

10. The first communication device according to claim 9, wherein the memory stores instructions that are executable by the processor whereby the first communication device is further configured to adjust one or more transmission parameters configured to be used by the first communication device based on an indication of a success of transmission of at least the second part with the second MCS, the indication being configured to be received from the second communication device.

11. The first communication device according to claim 9, wherein the memory stores instructions that are executable by the processor whereby the first communication device is further configured to:
obtain the second MCS configured to be used for the transmitting of the second part from at least one of:
a memory in the first communication device,
the second communication device or another communication device in the wireless communications network, or
a determination by the first communication device.

12. The first communication device according to claim 11, wherein the second MCS is determined based on one of the first MCS or a frame sequence number of the set of time-frequency resources.

13. The first communication device according to claim 9, wherein the memory stores instructions that are executable by the processor whereby the first communication device is further configured to determine whether the second part is to comprise the at least one of the padding or the additional data, based on an amount of the additional data in a buffer of the first communication device.

14. A second communication device configured to adjust one or more transmission parameters, the second communication device being configured to operate in a wireless communications network, the second communication device comprising:
a processor and a memory, wherein the memory stores instructions that are executable by the processor whereby the second communication device is configured to:
decode data received from a first communication device operating in the wireless communications network, the data being comprised in a set of time-frequency resources scheduled for transmission to the second communication device, the set of time-frequency resources having a fixed duration, and the set of time-frequency resources comprising:
- a first part comprising the data, the first part having a shorter duration than the fixed duration of the set of time-frequency resources, and wherein the decoding of the data in the first part is performed according to a first MCS, and
- a second part having a remaining duration of the fixed duration of the set of time-frequency resources, the second part comprising at least one of a padding, or additional data from the first communication device, and wherein the decoding further comprises decoding said at least one of the padding or the additional data with a second MCS, the second MCS being different than the first MCS; and
- adjust one or more transmission parameters used by the second communication device based on a success of the decoding of the second part with the second MCS,
- wherein the set of time-frequency resources are scheduled for simultaneous transmission, by a plurality of communication devices including the first communication device, and the remaining duration of the second part enables the set of time-frequency resources for the plurality of communication devices to finish at a same time.

15. The second communication device according to claim 14, wherein the memory stores instructions that are executable by the processor whereby the second communication device is configured to at least one of the following:
- obtain the second MCS to be used for at least one of transmission of the second part by the first communication device or the decoding of the second part, the obtaining being from at least one of:
- a memory in the second communication device;
- the first communication device or another communication device in the wireless communications network;
- a determination by the second communication device; or
- historical data collected by the second communication device on a probability of successful transmission based on the first MCS and the second MCS; or
- determine whether the second part is to comprise the at least one of the padding or the additional data, the determining being based on an amount of the additional data in a buffer of the first communication device.

16. The second communication device according to claim 15, wherein the memory stores instructions that are executable by the processor whereby the second communication device is configured to send, to the first communication device, at least one of:
- the obtained second MCS; or
- an indication of whether the second part is to comprise the at least one of the padding or
- the additional data, as determined by the second communication device.

* * * * *